(12) United States Patent
Elias et al.

(10) Patent No.: US 7,575,324 B2
(45) Date of Patent: Aug. 18, 2009

(54) HOLDING ASSEMBLY FOR A CAMERA SYSTEM

(75) Inventors: James Elias, Munich (DE); David Schuster, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 745 days.

(21) Appl. No.: 11/347,556

(22) Filed: Feb. 3, 2006

(65) Prior Publication Data
US 2007/0182930 A1   Aug. 9, 2007

(51) Int. Cl.
*G03B 17/14* (2006.01)
(52) U.S. Cl. ............. 352/243; 248/187.1; 396/422; 224/908; 348/373
(58) Field of Classification Search .......... 352/243; 248/178.1, 187.1; 396/419, 422, 498; 224/908; 348/373
See application file for complete search history.

(56) References Cited

U.S. PATENT DOCUMENTS

| | | | | |
|---|---|---|---|---|
| 4,946,272 A | * | 8/1990 | Brown | ............ 352/243 |
| 5,229,798 A | * | 7/1993 | Brown | ............ 352/243 |
| 6,161,933 A | | 12/2000 | Tschida et al. | |
| 7,390,131 B2 | * | 6/2008 | Schaller | ............ 396/421 |

FOREIGN PATENT DOCUMENTS

| | | |
|---|---|---|
| DE | 40 18 414 A1 | 12/1991 |
| EP | 0 574 105 A1 | 12/1993 |
| EP | 0 910 814 B1 | 4/1999 |

* cited by examiner

*Primary Examiner*—William C Dowling
(74) *Attorney, Agent, or Firm*—Christie, Parker & Hale, LLP

(57) ABSTRACT

A holding assembly for a camera system comprises a first pair of support rods connected to the camera system and extending from the camera system and at least one functional device. A first support element having at least a first pair of recesses on a side of the support element pointing towards the pair of support rods and at least a pair of noses is attached to the first pair of support rods by inserting the first pair of support rods into the first of pair of recesses. A second support element with at least a second pair of recesses on a side pointing towards the first support element holds the at least one functional device and is attached to the first support element by inserting the pair of noses on the first support element into the second pair of recesses in the second support element. The invention, thus, provides a holding assembly which allows an easy attachment and detachment of a functional device to and from a camera system, is convenient in its handling and reliable in its operation.

15 Claims, 6 Drawing Sheets

HOLDING ASSEMBLY FOR A CAMERA SYSTEM

FIELD OF THE INVENTION

The invention generally relates to holding assemblies for attaching functional devices such as a follow focus drive, a zoom drive, an iris drive and a lens support, to a camera system.

BACKGROUND OF THE INVENTION

Modern camera systems such as movie cameras or video cameras include a lens assembly which is adjustable in order to set and vary a number of lens parameters such as the iris opening, the focus and the zoom of the lens assembly. The setting of the iris opening, the focus and the zoom is performed by adjusting lens rings of the lens assembly of the camera system. For this purpose and to achieve an easy and reliable adjustment of the lens assembly, functional devices are attached to the camera system and are engaged with the lens rings of the lens assembly, the functional devices being in particular a follow focus drive to continuously adjust the focus of the lens assembly, a zoom drive to adjust the zoom, an iris drive to set the iris opening, and a lens support to hold an additional lens.

EP 0 574 105 A1 discloses a control system for a camera system featuring functional devices for adjusting the zoom, the focus and the iris setting of a lens assembly of the camera system. Each functional device is connected to a control unit which allows controlling the operation the functional devices.

In particular, functional devices are attached to a camera system using a holding assembly. Such a holding assembly features a bridge plate connected to the camera, support rods extending in parallel from the bride plate and holding elements to connect the functional devices to the support rods. The bridge plate is attachable for example to a stand such as a tripod. In general, the holding elements feature cylindrical guide holes, which can be slid onto the support rods and are guided by the support rods in order to attach the functional devices to the camera system and adjust the position of the functional devices relative to the lens assembly of the camera system such that the functional devices can be brought into engagement with the lens rings of the lens assembly.

Such holding assemblies have the disadvantage that their handling is cumbersome and impractical. For example, in order to remove a functional device connected to a holding element located close to the bridge plate on the support rods, other holding elements must be removed from the support rods, so that the holding element with the functional device can be slid from the support rods. Thus, to remove one functional device from the camera system in order to replace it by a different functional device, other functional devices must also be removed from the camera system, which in general is inconvenient and time consuming.

SUMMARY OF THE INVENTION

It is an object of the invention to provide a holding assembly which is convenient in its handling and operation and ensures a reliable and easy attachment of functional devices to a camera system.

It is a further object of the invention to provide a holding assembly which is versatile such that functional devices can either be attached to the holding assembly of a first camera system or to the holding assembly of a second camera system in an easy manner.

These objects are achieved by providing a holding assembly according to the present invention. Accordingly, a holding assembly for a camera system comprises a first pair of support rods connected to the camera system and extending from the camera system, a functional device, a first support element with a first pair of recesses on a side of the support element pointing towards the pair of support rods and with a pair of noses, and a second support element with a second pair of recesses on a side pointing towards the first support element. The first support element herein is attached to the first pair of support rods by inserting the first pair of support rods into the first pair of recesses. At the same time, the second support element holds the functional device and is attached to the first support element by inserting the pair of noses on the first support element into the pair of recesses in the second support element. Thus, the functional device is connected to the support rods and accordingly to the holding assembly via the first and the second support element, the second support element being connected to the first support element via the pair of recesses in the second support element and the pair of noses in the first support element.

The invention provides a holding assembly with attachment means for an easy connection of a functional device to a camera system. The functional device herein is attached to support rods of the holding assembly via a first and a second support element, wherein both in the first and the second support element recesses are provided for attaching the first support element to the support rods and the second support element to the first support element, respectively. With the recesses in the first and second support elements means are provided for a convenient and reliable attachment, wherein the attachment is achieved by simply inserting the support rods into the recesses of the first support element and the noses of the first support element into the recesses of the second support element.

The holding assembly can be used in connection with a camera system such as a movie camera or a video camera. In general, movie cameras are larger and heavier and require heavier components for their operation. In turn, holding assemblies of video cameras tend to be smaller in size and lighter in weight. Preferably then, with the holding assembly a functional device is either attachable to a movie camera or a video camera with their different holding assemblies.

The functional devices in this context can be a follow focus drive, a zoom drive, an iris drive or a lens support for a camera system.

In a preferred embodiment, the first support element is detachable from the first pair of support rods by removing the first pair of support rods from the recesses of the first support element. In an analogous manner, the second support element can be detachable from the first support element by removing the noses on the first support element from the recesses of the second support element. This allows detaching the functional device from the holding assembly by either detaching the first support element from the support rods or by detaching the second support element from the first support element. The detachment herein is easy and convenient and does not require the removal of other functional devices from the holding assembly. In particular, the detachment can be achieved by simply pulling off the first support element from the first pair of support rods or the second support element from the first support element.

Preferably, the functional device is attachable to a second pair of support rods after detaching the second support element holding the functional device from the first support element. The attachment to the second pair of support rods is achieved by inserting the second pair of support rods into the recesses in the second support element. This is in particular advantageous, if the second pair of support rods belongs to a second holding assembly and has different dimensions with support rods of a different diameter and distance from each other. The recesses in the second support element can then be designed to have a different diameter and distance, such that they are suitable to fittingly receive the second pair of support rods of the second holding assembly. This, then, allows for a replacement of the functional device by detaching the functional device from the first pair of support rods of the first camera system and attaching the functional device to the second pair of support rods of the second camera system.

In a preferred embodiment of the invention the first pair of recesses in the first support element and the second pair of recesses in the second support element are designed as quick-lock attachments for attaching the first support element to the first pair of support rods and the second support element to the first support element. The quick-lock attachments allow to attach the first support element to the first pair of support rods by inserting the first pair of support rods into the first pair of recesses in the first support element and quick-locking the attachment to ensure a fixed and fast connection between the first support element and the first pair of support rods. Equally, the quick-lock attachment between the second support element and the first support element allows a quick and reliable connection between the second support element and the first support element. The quick-lock attachment may for example be realized such that the recesses are snapped onto the support rods or the noses of the first support element, respectively, and are fastened by locking means such as clamps or bolts.

In a further embodiment of the invention the first pair of support rods extends in parallel from the camera system. In that case the first support element may be positioned anywhere along the first pair of support rods and may be attached to the first pair of support rods by inserting the first pair of support rods into the recesses in the first support element.

The first support element herein may be arranged perpendicularly to the first pair of support rods such that it extends between the two support rods of the first pair of support rods.

The support rods of the first pair of support rods preferably have a cylindrical shape and fit into the first pair of recesses in the first support element. The recesses of the first support element then advantageously have a half-cylindrical shape and, being arranged on the side of the support element pointing towards the first pair of support rods, are open towards the first pair of support rods. By inserting the first pair of support rods into the recesses of the first support element the first pair of support rods is clamped into the recesses and is attached to the first support element. The shape of the support rods, however, is not a limitation of the invention. In principle, the support rods may also have a rectangular shape corresponding to a rectangular shape of respective recesses in the first support element.

The pair of noses provided on the first support element and the pair of recesses in the second support element may be designed in an analogous manner. In particular, the noses on the first support element may have a substantially cylindrical shape and may be fittingly inserted into the recesses in the second support element having a half-cylindrical shape. By inserting the noses of the first support element into the recesses of the second support element the second support element is attached to the first support element and via the first support element to the first pair of support rods of the holding assembly.

In one embodiment of the invention the pair of noses on the first support element is arranged on the side of the first support element pointing away from the first pair of support rods. The second support element is then arranged on the first support element on the side of the first support element pointing away from the first pair of support rods. In principle, also an arrangement of the noses on the side of the support element pointing towards the first pair of support rods is possible, providing an attachment of the second support element to the first support element on the same side as the attachment with the first pair of support rods.

In another embodiment of the invention the holding assembly comprises a bridge plate for mounting a camera system on a carrying fixture such as a stand, a tripod, a rack, a rig, a camera carriage, a crane or another fixture for carrying the camera system. The first pair of support rods in this case is connected to the bridge plate and extends outward from the bridge plate. Via the first pair of support rods, the first and second support elements with the functional device can then be attached to the bridge plate and via the bridge plate to the camera system. By using a bridge plate a completely modular design is provided, allowing for a detachment of the holding assembly from the camera system and, thus, a replacement of the entire holding assembly. With such an arrangement, a maximum versatility is achieved by providing functional devices in a separate module being attachable to the camera system.

BRIEF DESCRIPTION OF THE DRAWINGS

Other advantages of the present invention will be readily appreciated from the following detailed description of the invention when considered in connection with the accompanying drawings wherein.

DETAILED DESCRIPTION OF THE INVENTION

Figure 1:
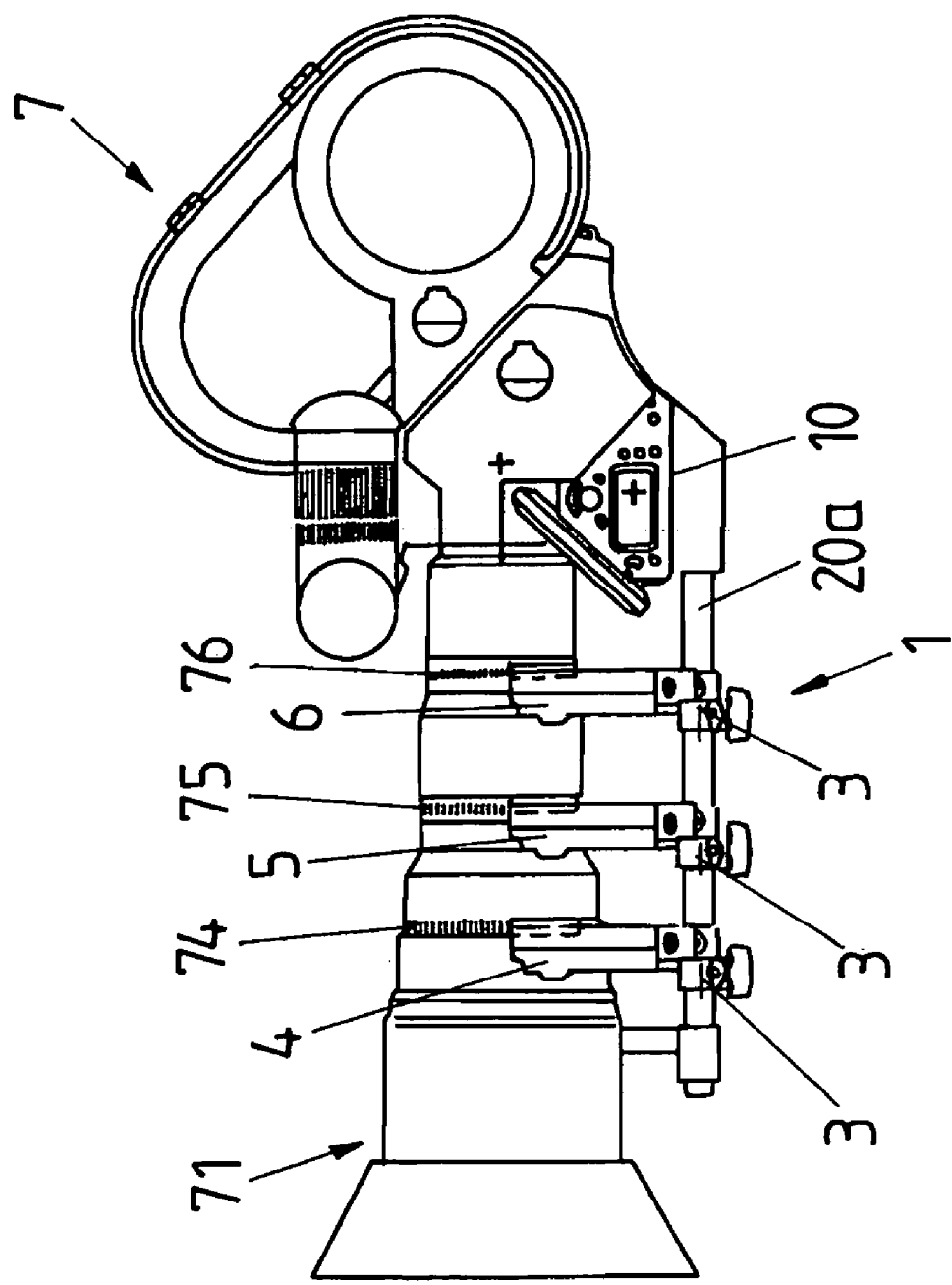
FIG. 1 is a side view of a camera system with a holding assembly.

A camera system with a holding assembly is shown in FIG. 1. The camera system 7 includes a lens assembly 71 with lens rings 74, 75, 76, which are engaged with functional devices 4, 5, 6. The functional devices 4, 5, 6 represent a follow focus drive 4, a zoom drive 5 and an iris drive 6 and are connected with the camera system 7 via holding elements 3 connected to support rods 20a, 20b. The support rods 20a, 20b are arranged in parallel and are attached to a bridge plate 10, which in turn is attached to the camera system 7.

Figure 2:
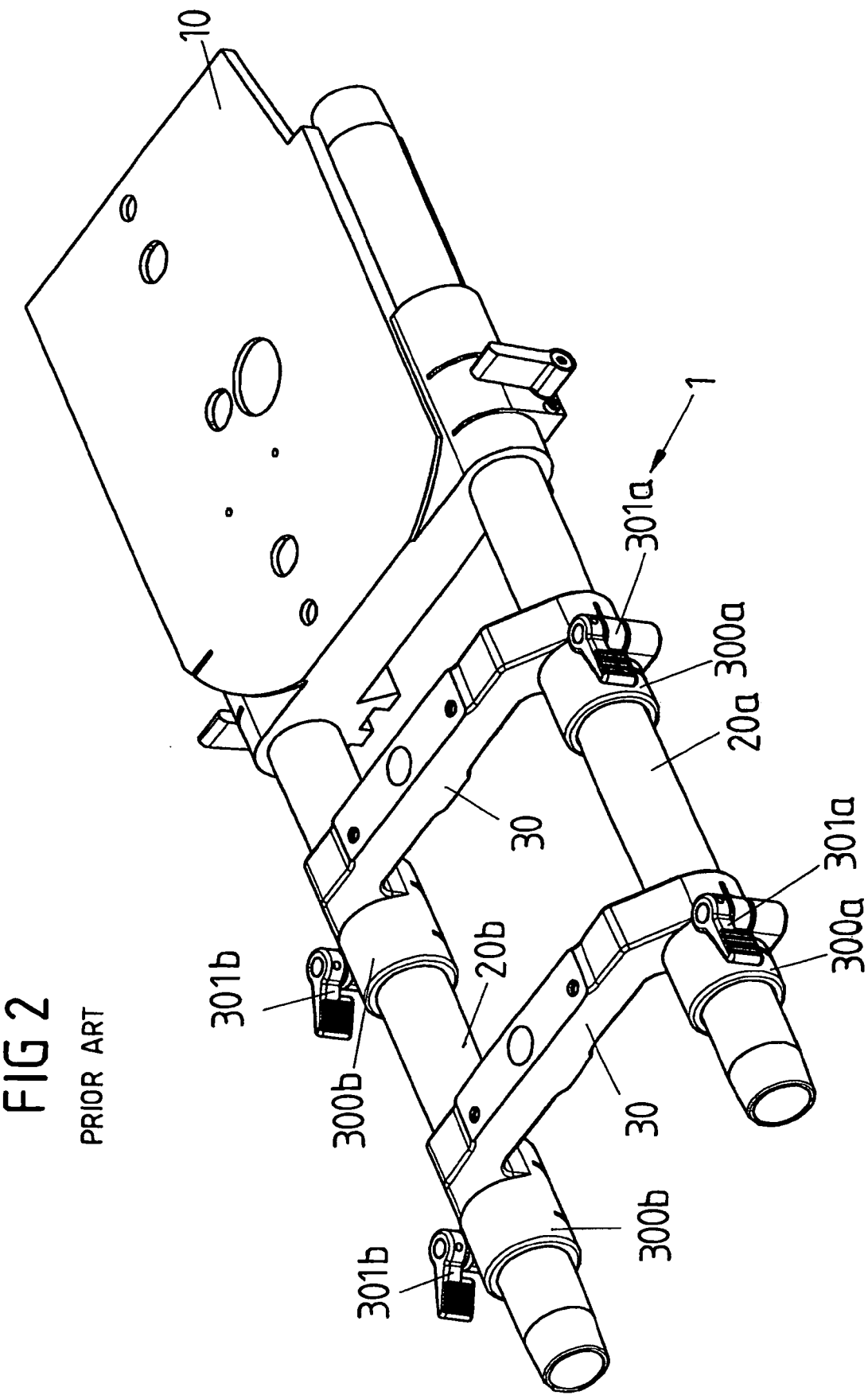
FIG. 2 is a detailed, perspective view of a holding assembly for a camera system according to the prior art.

The bridge plate 10 together with the support rods 20a, 20b and the functional devices 4, 5, 6 represents a holding assembly for attaching the functional devices 4, 5, 6 to the camera system 7. A detailed view of a holding assembly 1 according to the prior art is shown in FIG. 2. The holding assembly 1 comprises a pair of support rods 20a, 20b extending in parallel from the bridge plate 10, the bridge plate 10 being attachable to a fixture such as a stand, a tripod, a rack, a rig, a camera carriage, a crane or another fixture for carrying the camera system on its bottom side and to the camera system 7 on its top side, such that the camera system 7 is reliably fixed to for example a stand via the bridge plate 10. Functional devices 4, 5, 6 can be attached to the support rods 20a, 20b of the holding assembly 1 via support elements 30 representing the holding elements 3. The support elements 30 extend perpendicularly to the support rods 20a, 20b and each include a pair of guide holes 300a, 300b, which can be slid onto the support rods 20a, 20b and are guided by the support rods 20a, 20b. The guide holes 300a, 300b can be designed such that both guide holes have a cylindrical shape and fittingly match the shape and dimensions of the support rods 20a, 20b. In another embodiment one guide hole has a cylindrical shape matching the corresponding support rod, whereas the other guide hole is elongated in the horizontal direction of the support element 30, such that tolerances in the distance between the support rods 20a, 20b can be compensated. Using fixing clamps 301a, 301b, the support elements 30 are locked relative to the support rods 20a, 20b and are fixed in their position. The support elements 30 are designed to carry functional devices 4, 5, 6 and, thus, provide means to attach the functional devices 4, 5, 6 to the camera system 7.

The holding assembly according to FIG. 2 has the disadvantage that its handling can be cumbersome. For example, in order to remove the support element 30 closest to the bridge plate 10 from the support rods 20a, 20b, all support elements 30 must be removed from support rods 20a, 20b such that the support element 30 closest to the bridge plate can be slid from the support rods 20a, 20b. Thus, to remove one functional device 4, 5, 6 from the camera system 7 in order to replace it by a different functional device 4, 5, 6, all other functional devices 4, 5, 6 must also be removed from the camera system 7, which in general is inconvenient and time consuming.

Figure 3:
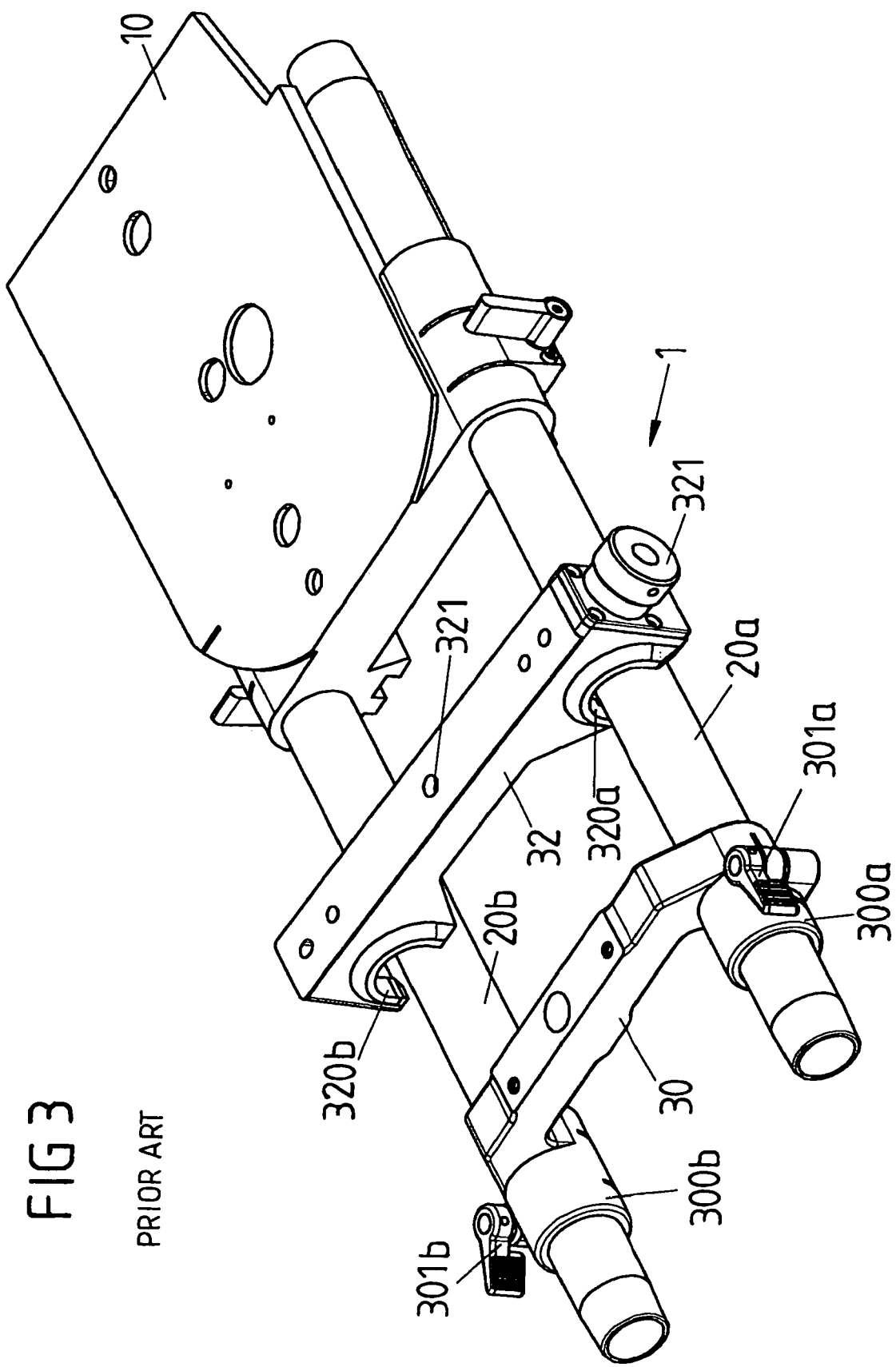
FIG. 3 is a detailed, perspective view of another holding assembly for a camera system according to the prior art.

To alleviate such disadvantages and provide a holding assembly which allows a more convenient and easier handling, different embodiments of the support elements can be used, the support elements representing holding elements 3 and being arranged on the support rods 20a, 20b of the holding assembly. Such a holding assembly is shown in FIG. 3 and features different kinds of support elements, in particular a support element 30 with a pair of guide holes 300a, 300b and a support element 32 with a pair of recesses 320a, 320b arranged on a side of the support element 32 pointing towards the support rods 20a, 20b. To attach the support element 32 to support rods 20a, 20b the support element 32 is placed upon the support rods 20a, 20b, and the support rods 20a, 20b are inserted into the recesses 320a, 320b in the support element 32. Then, in order to remove support element 32 from the holding assembly 1, the support element 32 is pulled of the support rods 20a, 20b in a vertical direction, such that the remaining support elements 30 located elsewhere on the support rods 20a, 20b do not have to be removed from the holding assembly for removing support element 32 from the support rods 20a, 20b. Such a support element having recesses for clamping the support element to a pair of support rods is disclosed for example in the German patent publication DE 40 18 414 A1.

Figure 4:
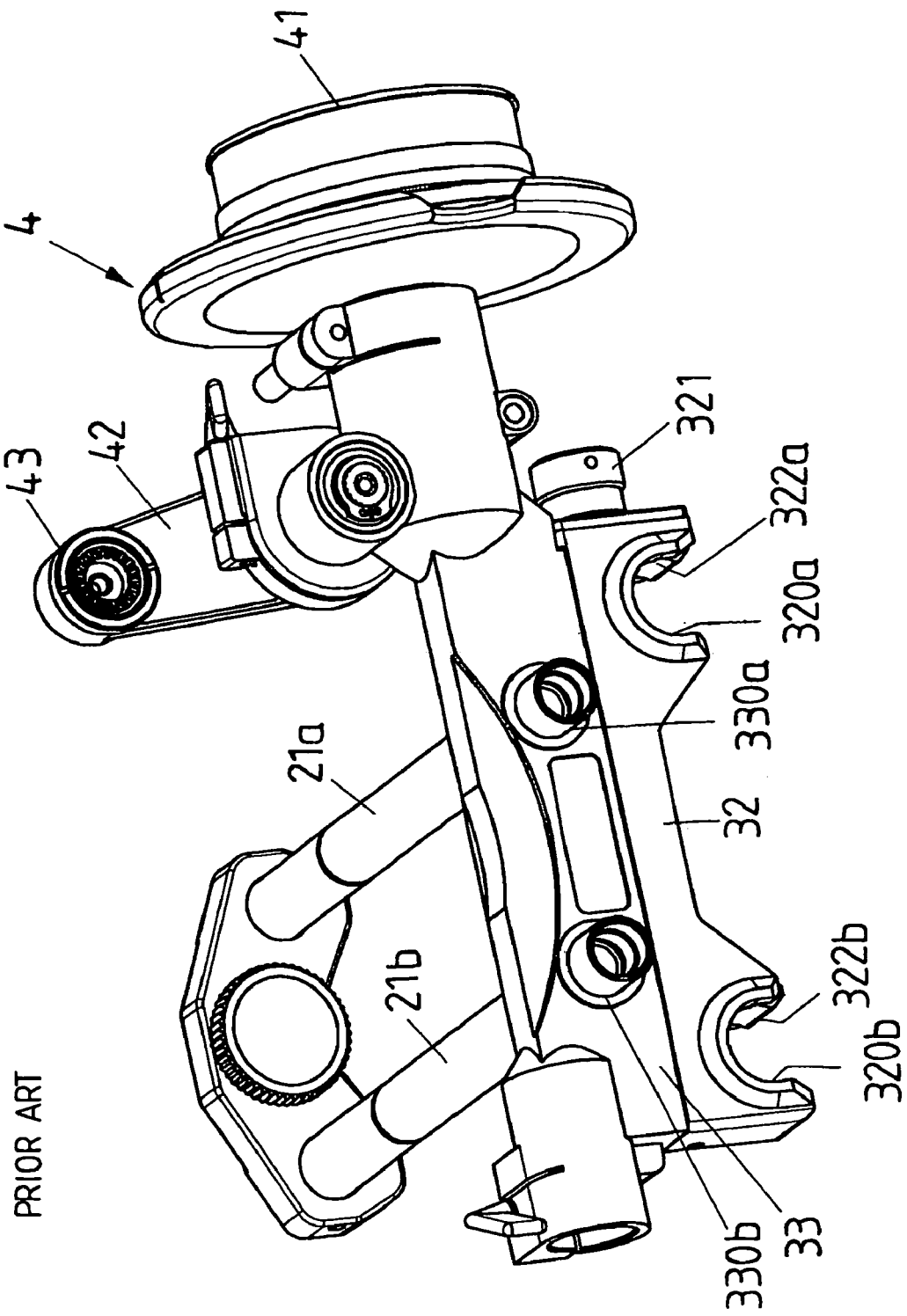
FIG. 4 is a detailed, perspective view of a functional device connected to a first support element of a holding assembly according to the prior art.

Using support element 32, a functional device can be attached to the holding assembly 1 and the camera system 7 by connecting it to the support element 32. This is shown in FIG. 4. Here, a functional device, in this case a follow focus drive 4, is attached via the support element 32 to the support rods 20a, 20b, being fixed to the support element 32 for example by screws. The follow focus drive 4 comprises a coupling 43 on an arm 42 to attach a gear to the follow focus drive 4 that is engaged with a lens ring 74 of a lens assembly 71 of the camera system 7 (see FIG. 1) for adjusting the focus of the camera system 7. Via the gear connected to the coupling 43, the lens ring 74 of the lens assembly 71 can then be adjusted by turning the knob 41 and thus rotating the gear attached to the coupling 43.

In the embodiment of the follow focus drive 4 according to FIG. 4, guide holes 330a, 330b are provided in the support element 33 to slide the follow focus drive onto a pair of second support rods 21a, 21b for attaching the follow focus drive 4 to the pair of second support rods 21a, 21b. The pair of second support rods 21a, 21b may be part of another camera system and, thus, provide means to attach the follow focus drive 4 to the other camera system. The follow focus drive 4 can then either be attached via the support element 32 with its recesses 320a, 320b to the holding assembly of a first camera system 7 or, via guide holes 330a, 330b in the support element 33, to the support rods 21a, 21b of a second camera system. The support rods 21a, 21b for example may be part of the holding assembly of a smaller camera system such as a video camera and, consequently, are arranged closer to each other and have a smaller diameter than the support rods 20a, 20b of the first, larger camera system 7.

The arrangement according to FIG. 4 has the disadvantage that a functional device 4 is attached fixedly to a support element 30, 32, such that a fast removal of the functional device 4 from the support element is not possible. Furthermore, the arrangement of the functional device 4 on the holding assembly 1 of a different camera system is inconvenient and rather impractical. There are, thus, limitations in the use of the functional device 4.

Figure 5:
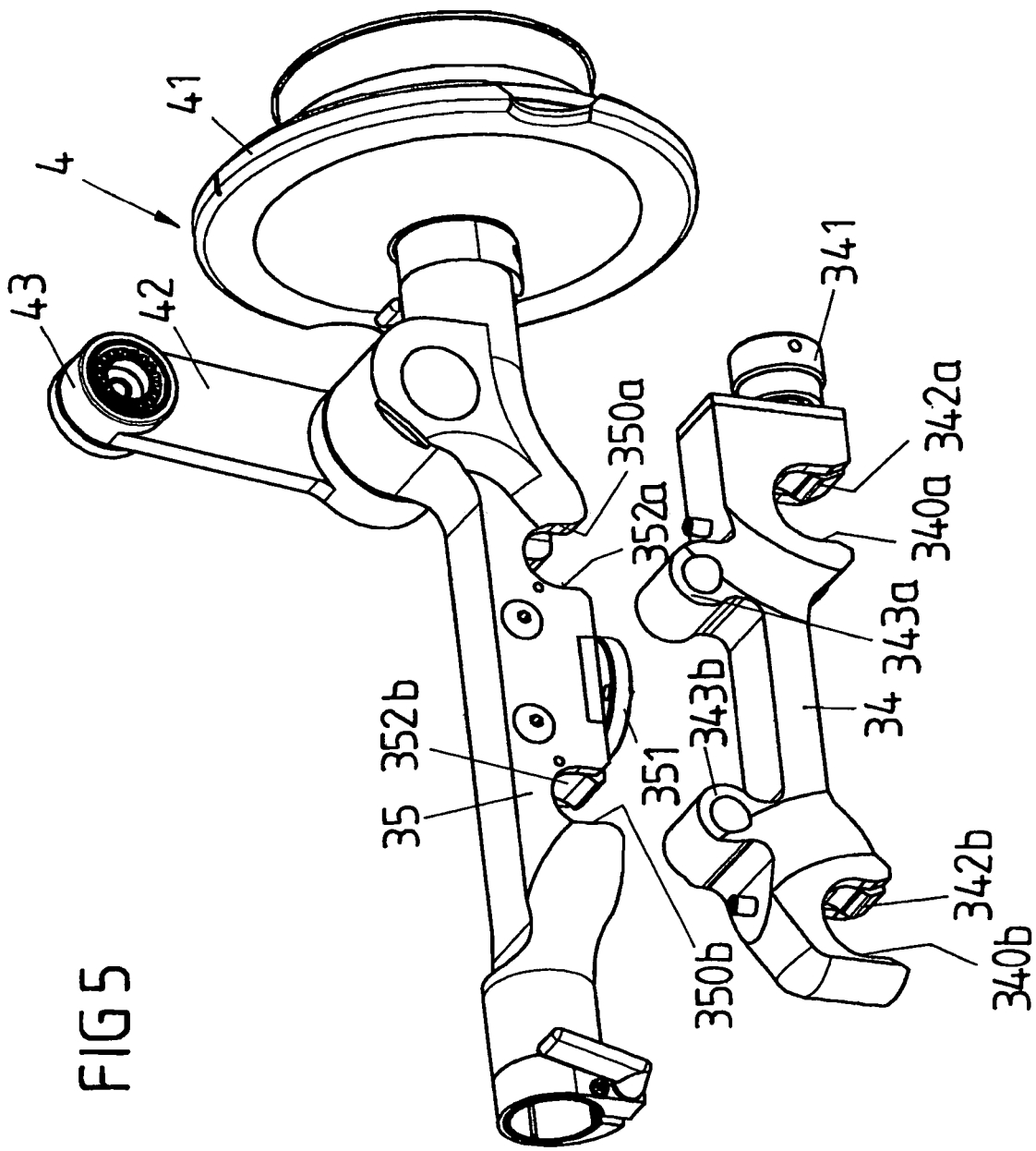
FIG. 5 is a detailed, perspective view of a functional device being attachable to a first support element of a holding assembly according to the present invention.
Figure 6:
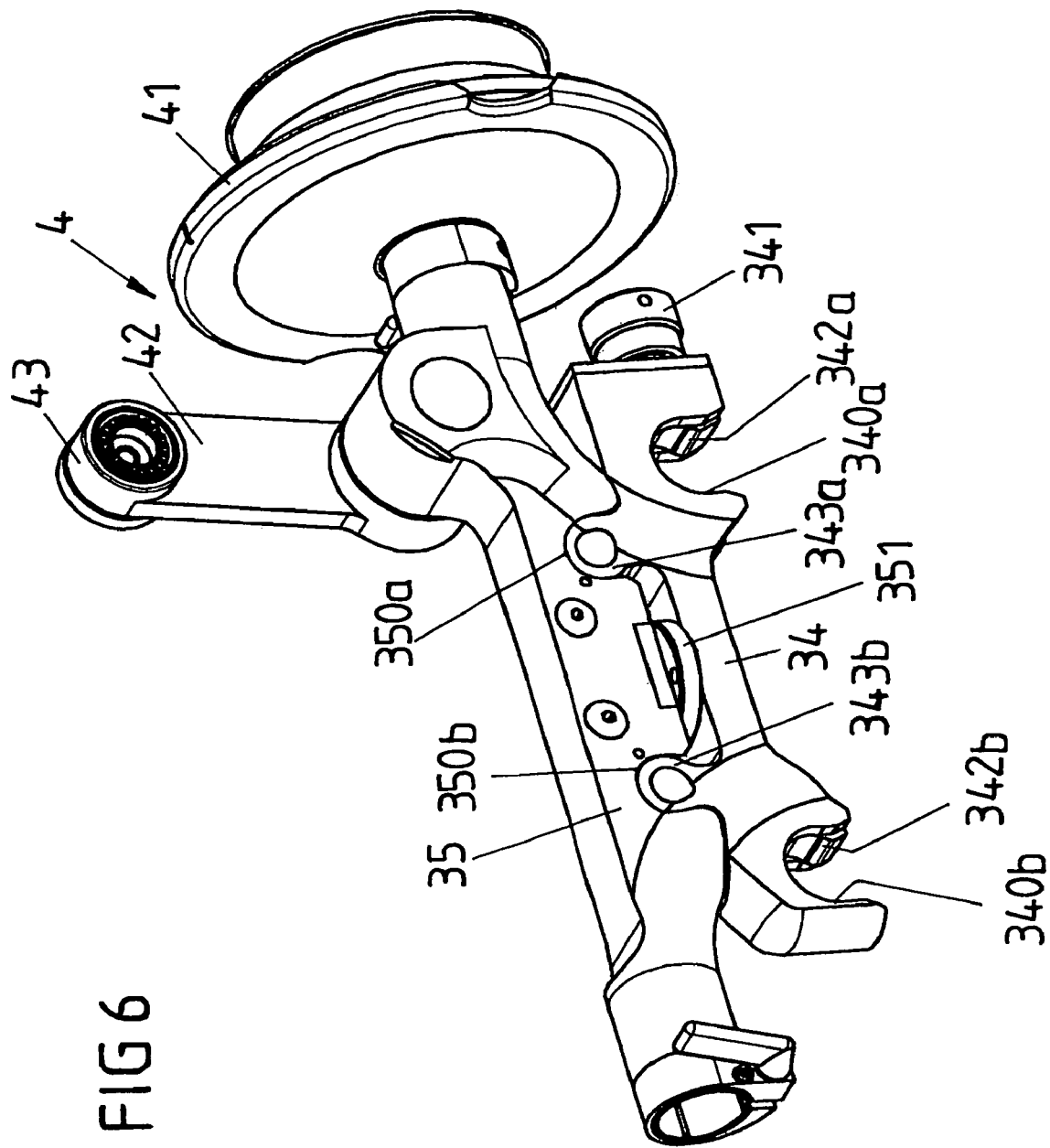
FIG. 6 is a detailed, perspective view of the functional device according to FIG. 5 in a state attached to the first support element of the holding assembly according to the present invention.

FIGS. 5 and 6 show a first and a second support element 34, 35 representing a holding element 3 of a holding assembly 1 according to the present invention. Herein, a functional device 4 is connected to the second support element 35, is attachable to the first support element 34 and via the first support element 34 to a pair of first support rods 20a, 20b (see FIGS. 1, 2 and 3). FIGS. 5 and 6 show the functional device 4 in a detached state (FIG. 5) and an attached state (FIG. 6). The functional device, in this case, represents a follow focus drive 4 with a coupling 43 disposed on an arm 42. The coupling 43 serves to connect a gear to the follow focus drive 4, which in the mounted state of the functional device 4 is engaged with a lens ring 74 of the camera system 7 (see FIG. 1) and can be rotated by a knob 41 in order to adjust the position of the lens ring 74 and via the lens ring 74 the focus of the camera system 7.

The functional device 4 is connected to a second support element 35 which on its bottom side has a pair of recesses 350a, 350b pointing towards the first support element 34. The recesses 350a, 350b in the second support element 35 have a half-cylindrical shape and can be brought into engagement with noses 343a, 343b on the first support element 34. In the engaged state, as shown in FIG. 6, the noses 343a, 343b of the first support element 34 are inserted into the recesses 350a, 350b of the second support element. The engagement herein is achieved by pressing the second support element 35 onto the first support element 34 such that the noses 343a, 343b snap into the recesses 350a, 350b. The noses 343a, 343b can lockingly be fixed within the recesses 350a, 350b by locking elements 352a, 352b, which may be pushed against the noses 343a, 343b in the attached state by turning the locking knob 351 and thereby locking the position of the noses 343a, 343b within the recesses 350a, 350b. Analogously, by reversing the turning of the locking knob 351 the attachment between the noses 343a, 343b and the recesses 350a, 350b and, thus, the attachment between the first support element 34 and the second support element 35 may be released and the second support element 35 with the functional device 4 may be removed from the first support element 34.

The first support element 34 can be attached via recesses 340a, 340b to the pair of support rods 20a, 20b as shown in FIGS. 2 and 3. The attachment of the first support element 34 to the support rods 20a, 20b herein is secured by locking elements 342a, 342b, which can be pushed against the support rods 20a, 20b in the attached state of the first support element 34 to securely fasten the support rods 20a, 20b within the recesses 340a, 340b. By turning the knob 341, then, in one direction the attachment is locked and can be unlocked by turning the knob 341 in the other direction.

Both the attachment means 350a, 350b, 351, 352a, 352b, 340a, 340b, 341, 342a, 342b between the first support element 34 and the pair of support rods 20a, 20b and between the second support element 35 and the first support element 34 are realized as quick-lock attachments. The attachment between the respective elements is achieved by inserting the support rods 20a, 20b into recesses 340a, 340b and by inserting noses 343a, 343b into recesses 350a, 350b, respectively. The attachment is then securely fastened by turning knobs 341, 351 and bringing locking elements 342a, 342b, 252a, 252b into engagement with noses 343a, 343b and support rods 20a, 20b, respectively.

The attachment operation, thus, only requires placing the first support element 34 onto support rods 20a, 20b and pressing the support rods 20a, 20b into recesses 340a, 340b, placing second support element 35 on the first support element 34 and pressing noses 343a, 343b into recesses 350a, 350b and locking the attachment by turning knobs 341, 351. Thus, the attachment between the first and the second support element 34, 35 and the support rods 20a, 20b is achieved by a purely vertical motion, such that a guiding of the first support element 34 along the support rods 20a, 20b is not necessary. This ensures an easy and convenient attachment of the functional device 4 to the support rods 20a, 20b, alleviating the need of removing other functional devices from the support rods 20a, 20b when removing one functional device.

The functional device 4 being connected to the second support element 35 can be attached via recesses 350a, 350b to noses 343a, 343b of the first support element 34. Via the first support element 34 the functional device 4 is then attached to the support rod 20a, 20b of a camera system 7. Herein, the recesses 350a, 350b of the second support element 35 have the same diameter as the noses 343a, 343b of the first support element. Likewise, recesses 340a, 340b of the first support element 34 have the same diameter as the support rods 20a, 20b, such that the support rods 20a, 20b can be fittingly inserted into the recesses 340a, 340b. The diameter of the support rods 20a, 20b and the distance between the support rods 20a, 20b and accordingly the diameter of the recesses 340a, 340b and the distance between the recesses 340a, 340b may be substantially different than the diameter of the noses 343a, 343b and the recesses 350a, 350b and the distance between the noses 343a, 343b and between the recesses 350a, 350b. The first support element 34, thus, functions as an adapter between the second support element 35 and the first pair of support rods 20a, 20b.

Via recesses 350a, 350b of the second support element 35 also a connection between the second support element 35 and a second pair of support rods 21a, 21b (see FIG. 4) is possible. With recesses 350a, 350b, then, an attachment of the functional device 4 either to a first pair of support rods 20a, 20b via the first support element 34 or an attachment to a second pair of support rods 21a, 21b becomes possible. The functional device 4, thus, can be used in connection with different camera systems having different holding assemblies including different support rods and can be freely exchanged between the different camera systems.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the following claims the invention may be practiced otherwise than as specifically described.

What is claimed:

1. A holding assembly for a camera system, comprising:
   a first pair of support rods connected to said camera system and extending from said camera system;
   at least one functional device;
   a first support element with at least a first pair of recesses on a side of the support element pointing towards said pair of support rods and at least a pair of noses, wherein said first support element is attached to said first pair of support rods by inserting said first pair of support rods into said first of pair of recesses;
   a second support element with at least a second pair of recesses on a side pointing towards said first support element, said second support element holding said at least one functional device and being attached to said first support element by inserting said pair of noses on said first support element into said second pair of recesses in said second support element.

2. The holding assembly as recited in claim 1, wherein said camera system is at least one of the group of a movie camera and a video camera.

3. The holding assembly as recited in claim 1, wherein said functional device is at least one of the group of a follow focus drive, a zoom drive, an iris drive and a lens support for said camera system.

4. The holding assembly as recited in claim 1, wherein said first support element is detachable from said first pair of support rods.

5. The holding assembly as recited in claim 1, wherein said second support element is detachable from said first support element.

6. The holding assembly as recited in claim 5, wherein said second support element is attachable to a second pair of support rods via said pair of recesses provided in said second support element.

7. The holding assembly as recited in claim 6, wherein said second pair of support rods are part of a second camera system.

8. The holding assembly as recited in claim 1, wherein said first pair of recesses in said first support element and said second pair of recesses in said second support element are designed as quick-lock attachments for attaching said first support element to said first pair of support rods and said second support element to said first support element.

9. The holding assembly as recited in claim 1, wherein said first pair of support rods extend in parallel from said camera system.

10. The holding assembly as recited in claim 9, wherein said first support element is arranged perpendicularly to said first pair of support rods extending in parallel for attaching said first support element to said first pair of support rods.

11. The holding assembly as recited in claim 1, wherein said first pair of support rods have a cylindrical shape and said first pair of recesses in said first support element and said second pair of recesses in said second support element have a substantially half-cylindrical shape, said first pair of support rods being fittingly inserted into said first pair of recesses for attaching said first support element to said first pair of support rods.

12. The holding assembly as recited in claim 11, wherein said pair of noses provided on said first support element has a substantially cylindrical shape and is fittingly inserted into said second pair of recesses of said second support element having a substantially half-cylindrical shape for attaching said second support element to said first support element.

13. The holding assembly as recited in claim 1, wherein said pair of noses on said first support element is arranged on a side of said first support element pointing away from said first pair of support rods.

14. The holding assembly as recited in claim 13, wherein said second support element is arranged on a side of said first support element pointing away from said first pair of support rods for attaching said second support element to said first support element.

15. A holding assembly for a camera system, comprising:
- a bridge plate for mounting the camera on a fixture for carrying said camera system;
- a first pair of support rods connected to said bridge plate and extending from said bridge plate;
- at least one functional device;
- a first support element with at least a first pair of recesses on a side of the support element pointing towards said pair of support rods and at least a pair of noses, wherein said first support element is attached to said first pair of support rods by inserting said first pair of support rods into said first of pair of recesses;
- a second support element with at least a second pair of recesses on a side pointing towards said first support element, said second support element holding said at least one functional device and being attached to said first support element by inserting said pair of noses on said first support element into said second pair of recesses in said second support element.

* * * * *

UNITED STATES PATENT AND TRADEMARK OFFICE
CERTIFICATE OF CORRECTION

PATENT NO. : 7,575,324 B2  Page 1 of 1
APPLICATION NO. : 11/347556
DATED : August 18, 2009
INVENTOR(S) : Elias et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this

Seventh Day of September, 2010

David J. Kappos
*Director of the United States Patent and Trademark Office*